H. Rogers.

Sawing Shingles.

N° 54,019.    Patented Apr. 17, 1866.

Witnesses:
Theo Tusch
W. B. Covington

Inventor:
H. Rogers

H. Rogers,
Sawing Shingles.
N° 54,019.    Patented Apr. 17, 1866.
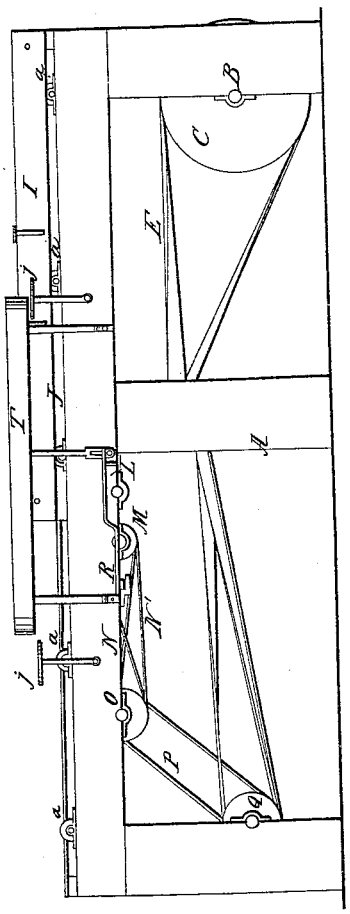
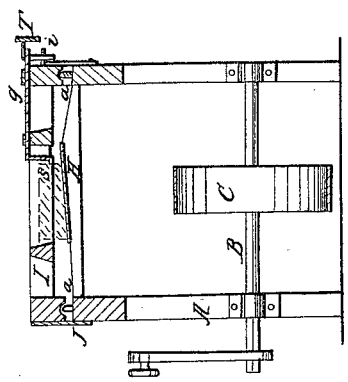
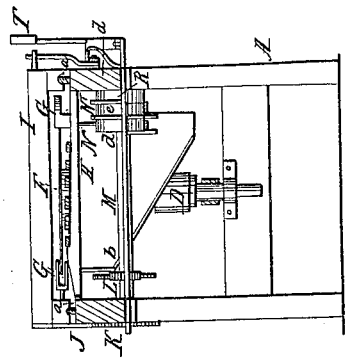
Witnesses:
Inventor:
H Rogers

UNITED STATES PATENT OFFICE.

HENRY ROGERS, OF EUREKA, CALIFORNIA.

IMPROVEMENT IN SHINGLE-MACHINES.

Specification forming part of Letters Patent No. 54,019, dated April 17, 1866.

*To all whom it may concern:*

Be it known that I, HENRY ROGERS, of Eureka, in the county of Humboldt and State of California, have invented a new and Improved Shingle-Machine; and I do hereby declare that the following is a full, clear, and exact description thereof, which will enable others skilled in the art to make and use the same, reference being had to the accompanying drawings, forming part of this specification, in which—

Figure 1:
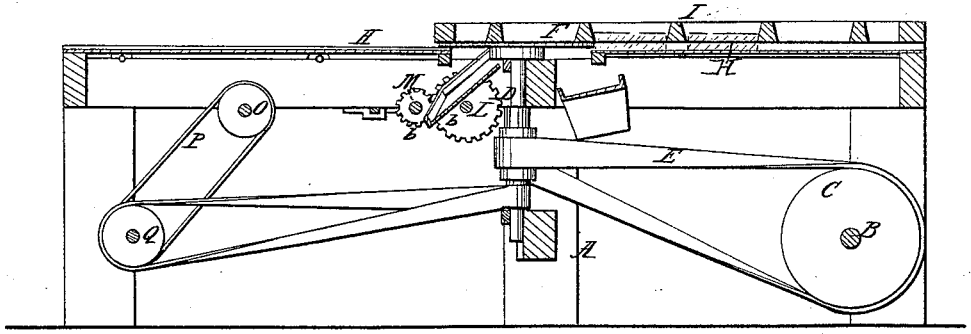
Figure 2:
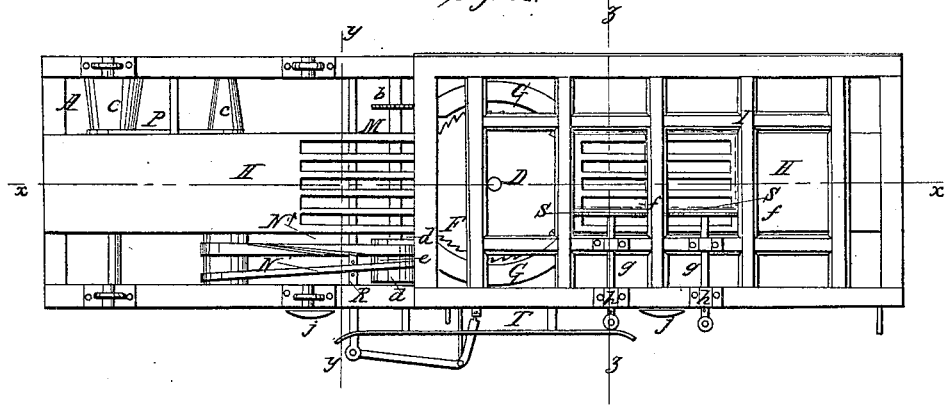

Figure 1, Sheet No. 1, is a side sectional view of my invention, taken in the line $x\,x$, Fig. 2; Fig. 2, a plan or top view of the same; Fig. 3, Sheet No. 2, a transverse vertical section of my invention, taken in the line $y\,y$, Fig. 2; Fig. 4, a side elevation of the same; Fig. 5, a transverse vertical section of the same, taken in the line $z\,z$, Fig. 2.

Similar letters of reference indicate like parts.

This invention relates to a new and improved shingle-machine of that class in which a horizontal circular saw is used for sawing the shingles from the bolts; and it consists in the employment or use of fixed gages, on which the bolts are fed to the saw by a carriage, all being arranged substantially as hereinafter set forth, whereby the work may be done very expeditiously, and the shingle cut all of a uniform taper.

A represents a frame, which may be constructed in any proper manner to support the working parts, and having a driving-shaft, B, placed transversely in its lower part at one end, with a drum, C, upon it, from which a vertical saw-arbor, D, is driven by a belt, E.

The saw-arbor D is about at the center of the frame A, and it has a circular saw, F, on its upper end, which works between two segment-guards G G.

On the frame A, at each side of the saw F, there are placed, longitudinally, gages H H. These gages have an inclined position in their transverse section, one gage being inclined in a reverse direction to that of the other, the inclination corresponding to the taper required to be given the shingles.

I represents a carriage, which is placed on the frame A, and runs on friction-rollers $a$. This carriage is provided at one side with a rack, J, into which a toothed wheel, K, on a shaft, L, gears, said shaft having a transverse position in the frame A, and rotated by gears $b$ from a shaft, M, parallel with it. This shaft M is rotated by either of two belts, N N′, one, N, being crossed from a shaft, O, which is driven by a belt, P, from a shaft, Q, said belt working over cone-pulleys $c\,c$ on the shafts O Q, for the purpose of regulating the speed. The belts N N′ are adjusted or moved by a belt-shipper, R, from idle pulleys $d\,d$ on shaft M to a working pulley, $e$, on said shaft. By these means a reciprocating motion is given the carriage I and the bolts fed to the saw.

The carriage is provided with openings $f$, in which the bolts are placed, and they rest on the gages H, and are held firmly while being sawed by clamps S S, attached to slides $g\,g$, which are fitted in guides $h$ at one side of the carriage, the clamps being kept in contact with the bolts by means of a spring-plate, T, attached to the frame A.

The inclination of the gages H H causes the shingles to be sawed in taper form, the bolts being sawed alternately from opposite sides of the saw as they pass entirely over it, and a cut is effected at each movement of the carriage. At the termination of each movement of the carriage, or after the bolts pass over the saw after each movement, the clamps holding the bolts are drawn out to relieve the latter, in consequence of pendent pins $i$, which are attached to the slides $g$, coming, after they pass the spring-plate T, in contact with segment-shaped projections $j$, attached to the side of frame A, and the bolts consequently fall or adjust themselves by their own gravity to the gages H H.

The whole arrangement is extremely simple and efficient. The belt-shipper R may be moved automatically by the movement of the carriage I.

Having thus described my invention, I claim as new and desire to secure by Letters Patent—

The fixed inclined gages H H, in combination with the circular saw F and reciprocating carriage I, substantially as and for the purpose set forth.

HENRY ROGERS.

Witnesses:
 FRANK A. WECK,
 A. HANSELL.